United States Patent [19]

Gooch

[11] Patent Number: 4,977,021

[45] Date of Patent: Dec. 11, 1990

[54] METHODS FOR FORMING MAGNETIC COATINGS USING TRIOXANE RECORDING MEDIA HAVING SUCH COATINGS

[75] Inventor: Jan W. Gooch, Atlanta, Ga.

[73] Assignee: Hoechst Celanese Corporation, Somerville, N.J.

[21] Appl. No.: 228,569

[22] Filed: Aug. 5, 1988

[51] Int. Cl.$^5$ .............................................. G11B 23/00
[52] U.S. Cl. .................... 428/329; 428/332; 428/694; 428/900; 528/241; 528/270; 252/62; 252/54
[58] Field of Search .................. 428/900, 694, 329; 524/432; 523/458; 528/241, 270; 252/62.54

[56] References Cited

U.S. PATENT DOCUMENTS

| | | |
|---|---|---|
| 3,231,543 | 1/1966 | Jamison ................................ 260/67 |
| 3,275,585 | 9/1966 | Baum et al. ........................... 260/28 |
| 3,470,020 | 9/1969 | Boudreaux et al. .................. 117/236 |
| 3,681,472 | 8/1972 | Jamison .............................. 260/836 |
| 3,996,395 | 12/1976 | Chen et al. .......................... 427/129 |
| 4,004,997 | 1/1977 | Tsukamoto et al. ............ 204/159.14 |
| 4,189,514 | 2/1980 | Johnson .............................. 428/331 |
| 4,267,206 | 5/1981 | Johnson .............................. 427/128 |
| 4,277,388 | 7/1981 | Kagami et al. ..................... 260/33.4 |
| 4,299,888 | 11/1981 | Pickart et al. ....................... 428/457 |
| 4,404,247 | 9/1983 | Dominguez-Burguette et al. ........................................ 428/213 |
| 4,407,901 | 10/1983 | Miyatsuka et al. ................. 428/694 |
| 4,518,656 | 5/1985 | Okota et al. ........................ 428/403 |
| 4,526,833 | 7/1985 | Burguette et al. .................. 428/336 |

FOREIGN PATENT DOCUMENTS 1225389  9/1966  Fed. Rep. of Germany .

OTHER PUBLICATIONS

"Developments in High Solids Magnetic Dispersions and Coatings", Jan W. Gooch, Journal of Coatings Technology, vol. 60, No. 757, Feb. 1988, pp. 37–44.

*Primary Examiner*—Paul J. Thibodeau
*Assistant Examiner*—Stevan A. Resan
*Attorney, Agent, or Firm*—Nixon & Vanderhye

[57] ABSTRACT

Methods for forming magnetic coatings on a nonmagnetic substrate include the application of a liquid film layer onto the substrate, the film layer being a dispersion of magnetic particles in a liquid resin binder solution which contains trioxane. The trioxane may or may not be removed from the cured layer. Thus, the trioxane may be present as a reactive solvent for the resin binder, in which case, a polymerization initiator for the trioxane is also present in the liquid film layer. The trioxane may then be polymerized in situ on the substrate to yield poly(oxymethylene).

32 Claims, No Drawings

METHODS FOR FORMING MAGNETIC COATINGS USING TRIOXANE RECORDING MEDIA HAVING SUCH COATINGS

FIELD OF THE INVENTION

This invention is related to the field of magnetic recording media. It particularly relates to processes for forming magnetic coatings, layers, films, etcetera, upon a substrate and to such formed coatings. According to the invention, trioxane is employed as a solvent in a liquid resin dispersion of magnetic particles so that a coating of the dispersion may be applied onto a suitable substrate during the manufacture of magnetic recording media. The trioxane may be reactive (i.e., polymerizable) by the inclusion of a suitable initiator so that in situ polymerization of the trioxane on the substrate may be accomplished.

BACKGROUND AND SUMMARY OF THE INVENTION

The magnetic tape industry is continually searching for better methods to produce magnetic media useful for specific end-use applications, such as audio, video, and computer information storage and retrieval applications. The conventional processing technique employed to produce these magnetic media generally includes dispersing magnetic pigment (usually acicular magnetic particles) in a binder resin/organic solvent solution, coating this liquid dispersion on a tape substrate, aligning the magnetic particles by passing the coated tape through a magnetic field of sufficient strength, and then calendaring the coated tape to achieve the desired surface properties. The resulting magnetic media thus generally consists of a nonmagnetic substrate and an overlying magnetic layer or film principally made of the magnetic particles and a resin binder matrix.

The organic solvents usually employed during the production of conventional magnetic media (e.g., methyl ethyl ketone, methyl isobutyl ketone, and the like) are, however, environmentally and toxicologically hazardous. This necessitates that the organic solvent be recovered completely during the production of magnetic media—a costly operation. It would therefore particularly be advantageous if an organic solvent system was employed which includes at least a meaningful amount of a non-hazardous organic substance. This would, therefore, reduce (if not eliminate) the costs associated with solvent recovery. And, it would also be desirable if a solvent system was available which would serve dual functions—that is, a system which would not only serve as a solvent for the binder resin, but which would also be polymerizable in situ on the substrate surface and thus remain as a component of the binder matrix, thereby obviating the need for its recovery. It is towards achieving these advantages that the present invention is directed.

According to the present invention, a magnetic dispersion is provided which includes a binder resin, magnetic particles, and an organic solvent system for the binder resin which includes relatively non-hazardous trioxane. The trioxane may thus be present as the sole solvent, or as a cosolvent with one or more organic solvents, thereby at least reducing (if not eliminating) the amount of potentially hazardous organic solvent needed to form magnetic coatings during the production of magnetic media. When used in this manner, the trioxane is allowed to sublime before it crystallizes (which may be facilitated by heating the substrate and/or the liquid dispersion to a temperature above the crystallization temperature of trioxane).

The trioxane may also be provided as a reactive solvent. That is, a suitable tioxane-polymerizing initiator (or polymerization initiator/catalyst system) may be incorporated into the liquid dispersions of this invention so that the trioxane is capable of being polymerized to poly(oxymethylene) in situ on the non-magnetic substrate. The resulting trioxane polymerization product (i.e., poly(oxymethylene)) is therefore present as a resin alloy in the binder resin matrix on the non-magnetic substrate.

Other advantages of this invention will become more clear after careful consideration is given to the following detailed description thereof.

DETAILED DESCRIPTION OF THE INVENTION

Any suitable binder resin may be employed in the practice of this invention. Thus, the binder resin may be any suitable resin or resin mixture conventionally employed in the production of magnetic media, such as vinyl chloride/vinyl acetate copolymers, polyurethanes, polyesters, polyisocyanate resins, polyamide epoxy resins, and mixtures of the same.

One specific example of a suitable resin which may be employed in accordance with this invention includes vinyl chloride/vinyl acetate/vinyl alcohol terpolymer having an inherent viscosity (ASTM D-1243) of about 0.53, a specific gravity (ASTM D-792) of about 1.39, a glass transition temperature ($T_g$) of about 79° C., and an average molecular weight of about 23,000 grams per mole. A particularly suitable terpolymer is the VAGH UCAR ® Solution Vinyl Resin commercially available from Union Carbide Corporation, Coatings Materials Division of Danbury, Conn.

Another specific example of a suitable binder resin is a polyester-based resin having a Brookfield Viscosity (ASTM BFG-1066B) of between about 400 to about 600 mPa·s, a specific gravity (ASTM D-792) of about 1.21, a Shore Hardness (ASTM D-2240) of about 87 A, a tensile strength (ASTM D-638) of about 44.1 MPa, and a glass transition temperature ($T_g$) of about −25° C. A specific polyester-based resin is the ESTANE ® 5701 F-1 Resin commercially available from the BF Goodrich Company of Cleveland, Ohio.

Commercial grade trioxane (1,3,5-trioxane) may be employed in the practice of the invention. The trioxane will have a molecular weight of about 90 grams per mole, a melting point of between about 61°–62° C., a boiling point of about 114.4° C., a specific gravity of about 1.17 at 65° C. ($H_2O=1$), and a vapor pressure at 20° C. of about 10.0 mm Hg. Trioxane is commercially available from the Engineering Plastics Division of Hoechst Celanese Corporation, Chatham, N.J.

The trioxane will preferably be present in the organic solvent system in an amount of up to about 50% by weight, and preferably in an amount between about 10% to 30% by weight. Trioxane in an amount of greater than 50% by weight of the solvent system (e.g., up to 100% by weight) could also be employed provided that the viscosity of the resulting liquid dispersion remains within acceptable limits (e.g., less than about 100 cp) to permit its application as a film on a substrate surface.

The organic solvent component of this invention is selected so as to be compatible with the binder resin, trioxane, and, if present, the trioxane polymerization initiator. That is, the organic solvent employed in this invention should be capable of solubilizing the trioxane and the binder resin without being reactive with either component. In this regard, organic solvents or solvent mixtures whose solubility parameter closely matches the solubility parameter of trioxane (e.g., between about 10.0 to about 11.5 Cal./cm$^3$) are particularly preferred. In addition, the organic solvent (or solvent mixture) is selected so that the resulting trioxane/organic solvent system will have desirable viscosity-reducing capability when the binder resin is added to the solvent system and thus result in a liquid dispersion which exhibits desired film-forming properties. Preferred solvents include methyl ethyl ketone, methyl isobutyl ketone, dioxane, acetaldehyde, and mixtures thereof, to name just a few. The selection of a particular binder resin/organic solvent system according to the present invention may also be aided using the techniques described in the article authored by the present inventor entitled "Developments in High Solids Magnetic Dispersions and Coatings", Journal of Coatings Technology, Vol. 60, No. 757, February, 1988 (the entire content of which is expressly incorporated hereinto by reference).

Virtually any type of magnetic particles conventionally employed to produce magnetic media may satisfactorily be employed in the practice of this invention. Thus, magnetic particles of metal oxides (e.g., gamma-$Fe_2O_3$, $Fe_3O_4$, and $CrO_2$), magnetic particles such as Fe, Co and Ni or magnetic alloy particles, or mixtures thereof may be employed. The selection of any specific type of magnetic particles will depend upon several factors including the type of media to be produced, the resulting information recording properties of the magnetic media, and the like. For most magnetic media according to this invention, however, the magnetic particles will be in the form of magnetic iron oxide particles. Preferably, such magnetic particles will be acicular, and thus magnetically orientable along the major axes of the particles. Magnetic iron oxide particles having an average length of between about 0.35 to about 0.45 micron, a length to width ratio of about 6:1, and a specific surface area (m$^2$/g) of between about 22 to about 29 are particularly preferred. Magnetic iron oxide particles of this type are commercially available from Pfizer Pigments Inc. of New York, N.Y. under the tradename Pferrox ™.

In order to achieve acceptable magnetic properties in the magnetic recording media of the present invention, the magnetic particles should be present in an amount of greater than about 50% by volume based upon the dry film thickness (DFT). The volumetric balance of the dry film thickness will thus be the cured binder resin matrix (or the binder resin/poly(oxymethylene) matrix if the trioxane is polymerized in situ on the surface of the underlying substrate).

A variety of additives may be employed in the liquid coating formulations of this invention so as to aid in the dispersion of the iron oxide particles. In this regard, any suitable dispersion agent, such as lecithin, silicon, and the like, may be incorporated into the coating formulations in minor amounts (e.g., up to about 2% by weight of the formulation).

When the magnetic media of this invention is embodied in the form of tapes, sheets, films, or the like, the substrate will preferably be a similarly configured polyester tape, sheet, film or the like. The thickness of the substrate is not critical to the practice of the present invention and is a function of the end use for the resulting media. One particularly preferred substrate is Mylar ® polyester film commercially available from E. I. DuPont de Nemours of Wilmington, Del. Other nonmagnetic substrates could, however, conceivably be used, including nonmagnetic resin films, nonmagnetic metals, paper and the like. The substrate, moreover, could be either rigid or flexible, again depending upon the particular end use for the resulting magnetic media.

Acid catalysis of trioxane produces a room temperature (70° C.) polymerization reaction which is controlled by acid concentration. Thus, when trioxane is to be polymerized in situ on the underlying substrate so that its polymerization product (i.e., poly(oxmethylene)) is present as an alloy with the binder resin, it is preferred that the initiator be added to the dispersion just prior to film formation on the substrate. The polymerization of trioxane will proceed sufficiently slowly so as to permit wet film formation, magnetic orientation and calendering.

Any suitable Lewis acid system may also be employed for the catalysis/initiation of trioxane polymerization. For example, aluminum trichloride ($AlCl_3$) and boron trifluoride etherate ($BF_3 \cdot OC_2H_5$), with or without a suitable acid catalyst (e.g., HCl), may be employed, with boron trifluoride etherate being particularly preferred. The initiator is, moreover, present in a concentration of between about 0.5 to about 1.5% by weight of the liquid dispersion.

The magnetic dispersions of this invention may be prepared using conventional apparatus. For example, laboratory samples of the magnetic dispersions according to this invention were prepared using a Hochmeyer High Speed Disperser, followed by milling in a Red Devil Sand Mill. Thus, the solvent system may first be prepared by blending trioxane and a suitable organic solvent (e.g., methylethyl ketone) by slow addition of the trioxane to the methylethyl ketone while agitating until the solution is clear. The binder resin may then be added to the resulting solvent system while agitating until the solution is again clear. The magnetic particles may then be added to the binder resin/solvent solution and dispersed therein using conventional apparatus.

A film of the thus prepared dispersion is formed on a nonmagnetic substrate by applying a sufficient amount of the liquid dispersion onto the substrate surface while the latter is being conveyed under a film-forming "doctor" blade. The doctor blade thus spreads a film of the dispersion of uniform thickness (e.g., between about 0.5 mil to about 6 mils) as a coating on the substrate surface. The coated film may then be passed through a magnetic field of sufficient strength (e.g., 4600 Gauss) so as to magnetically align the major axes of the magnetic particles substantially with the direction of substrate conveyance. Calendering of the coated, magnetically oriented substrate may then be accomplished so as to obtain desired surface characteristics for the magnetic coating.

It is particularly preferred that the substrate and/or the liquid dispersion be preheated to greater than about 60° C. before the dispersion is coated upon the substrate. This heating of the substrate, in the case where the trioxane component of the dispersion is not polymerized in situ on the substrate (i.e., in the case where the trioxane is present as the sole solvent for the binder resin), is important to prevent crystallization of the trioxane prior to its sublimation. Otherwise, the trioxane would crystallize and, upon sublimation, would leave surface voids in the magnetic coating. In the case where the trioxane component of the dispersion is polymerized in situ on the substrate (i.e., so that its polymerization product, poly(oxymethylene), is present as an alloy with the binder resin matrix), then heating of the substrate and/or dispersion enhances the catalysis reaction of the trioxane component. Preheating of the substrate may be accomplished in any expedient manner, for example, by subjecting the substrate to heated dry air and/or infrared irradiation.

A variety of trioxane-containing organic solvent formulations other than those described above may satisfactorily be employed according to the present invention so as to achieve in situ polymerization. For example, trioxane may be employed in combination with liquid cyclic ethers such as dioxolane, styrene oxide, tetrahydrofuran which will undergo a ring-opening polymerization when initiated with a Lewis, or protonic acid. Alternatively, styrene and trioxane may each be polymerized in situ on the substrate surface whereby the styrene component undergoes cationic polymerization via a vinyl group whereas the trioxane component undergoes polymerization via ring-opening polymerization. Boron trifluoride etherate may be employed to simultaneously initiate both such polymerization reactions and is also well suited for coatings formulations. The trioxane may also be initiated by boron trifluoride etherate so as to form polyoxymethylene which possesses hydroxyl endgroups. The hydroxyl endgroups may then react with oligomers or monomers of diisocyanate compounds present in the formulation to form urethane polymers.

The following nonlimiting Examples will provide a further understanding of this invention.

EXAMPLE I

A magnetic dispersion was formulated as noted below in Table 1 using trioxane based upon 22.7% magnetic iron oxide by volume in the dry film thickness (DFT).

TABLE 1

| Component | Density, g/cm$^3$ 20° C. | % Volume | % Weight | Notes |
|---|---|---|---|---|
| 1. Trioxane | 1.17 | 13.3 | 12.8 | (1) |
| 2. Methylethyl Ketone (MEK) | 0.81 | 66.6 | 43.9 | (1) |
| 3. VAGH Resin | 1.39 | 10.9 | 12.4 | (1) |
| 4. Magnetic Iron Oxide | 4.80 | 7.5 | 29.5 | (3) |
| 5. Lecithin (Alcolec BV) | 1.03 | 1.7 | 1.4 | |
| 6. Boron Trifluoride | 1.5 | | | (2) |

NOTES
(1) Viscosity of Tiroxane/MEK/VAGH Mixture is 90 cP.
(2) Boron trifluoride etherate added at 0.5% by weight of dispersion.
(3) Iron oxide in coating is 22.7% by volume.

Samples were prepared by applying a wet film of the dispersion in Table 1 to a polyester terephthalate film (DuPont Mylar ® polyester film), and the wet film was subjected to a magnetic field (4600 Gauss) so as to magnetically align the magnetic iron oxide particles. The resulting magnetic media were then examined for magnetic recording properties in comparison to a commercially available audio tape (TDK Corporation, Model AD60), the results of which are listed below in Table 2:

TABLE 2

| Magnetic Tape Sample | Coercivity Oe | Remanent Induction emu/cc $M_R/M_S$ | Squareness $S_\parallel/S_\perp/S_R$ |
|---|---|---|---|
| 1. Comparative (pulse aligned) | 660 | 24.05/31.94 | 0.85/0.53/1.60 |
| 2. Invention (static field aligned) | 360 | 46.98/53.41 | 0.88/0.41/2.14 |

SYMBOLS
Oe = Oersted units
emu/cc = electromagnetic units per cubic centimeter
$M_R$ = magnetization, remanence
$M_S$ = magnetization, saturation
$S_\parallel$ = parallel to alignment squareness
$S_\perp$ = perpendicular to alignment squareness
$S_R$ = ratio of $S_\parallel/S_\perp$ The data in Table 2 show that the magnetic media of the present invention are comparable in magnetic alignment to the commercial audio tape examined, at least with respect to magnetic squareness. And, it is entirely possible that, with subsequent processing (e.g., calendaring), the magnetic properties of the magnetic media according to the present invention may be improved.

EXAMPLE II

Magnetic iron oxide particles (Pferrox ™ 2228HC, Pfizer Pigments, Inc.) were dispersed in a 20% solution of binder resin (ESTANE ® 5701 F-1 thermoplastic polyurethane, BF Goodrich Company) and trioxane. Dispersion was accomplished with a turbine wheel mixer at 75° C. The iron oxide particles were further dispersed to a fine dispersion (Hegeman grind of 4). Films produced from the dispersion possessed a 70% gloss (measured by a glossmeter using incident light at 60°).

EXAMPLE III

Samples of trioxane as a solvent for a thermoplastic polyurethane binder resin (ESTANE ® 5701 F-1, BF Goodrich Company) were prepared. The samples were heated to 70° C. so as to melt the trioxane and dissolve the binder resin. Films were drawn on substrates of polyester terephthalate (DuPont Mylar ® polyester film, 8 inches × 10 inches × 6 mils) by fastening the substrates to a heated metal plate, and drawing the films with a Baker draw-down tool. The concentration of binder resin, film thickness, and substrate temperature were each separately varied and the resulting film consistency was determined by the percent clear area visually present in the film under back illumination. The results appear in Table 3 below:

TABLE 3

| Sample No. | Film Thickness (mils) | Substrate Temperature (°C.) | Binder Resin Conc., %* | Film Quality** % clear area |
|---|---|---|---|---|
| 1 | 1 | 74 | 10 | 60 |
| 2 | 3 | 74 | 10 | 65 |
| 3 | 6 | 82 | 10 | 100 |
| 4 | 1 | 76 | 20 | 100 |
| 5 | 3 | 74 | 20 | 80 |
| 6 | 6 | 74 | 20 | 70 |
| 7 | 1 | 82 | 10 | 90 |
| 8 | 3 | 82 | 10 | 90 |
| 9 | 6 | 76 | 10 | 100 |
| 10 | 1 | 82 | 20 | 80 |
| 11 | 3 | 82 | 20 | 100 |
| 12 | 6 | 76 | 20 | 80 |
| 13 | 1 | 98 | 10 | 95 |
| 14 | 3 | 98 | 10 | 100 |
| 15 | 6 | 98 | 10 | 100 |

TABLE 3-continued

| Sample No. | Film Thickness (mils) | Substrate Temperature (°C.) | Binder Resin Conc., %* | Film Quality** % clear area |
|---|---|---|---|---|
| 16 | 1 | 98 | 20 | 100 |
| 17 | 3 | 98 | 20 | 100 |
| 18 | 6 | 98 | 20 | 100 |

*The 30% ESTANE solution produced less than 10% clear area in all cases.
**Greater % clear area indicates better film consistency and quality.

It will be seen from Table 3 that optimum film quality is achieved with a substrate temperature of between 80° C. to 100° C., a binder resin concentration of between 10 to 20%, and a film thickness of between 1 to 6 mils. The data in Table 3 also indicate the importance of substrate heating (particularly when trioxane is employed as the sole solvent for the binder resin) since substrate heating apparently allows the trioxane to sublime prior to crystallization thereby resulting in films of good quality (as determined by the percent clear area).

EXAMPLE IV

Magnetic dispersions were formulated as indicated in Table 4 below based upon 50% by volume of iron oxide particles in the dry film thickness using trioxane as a cosolvent with methylisobutyl ketone (MBK) and methylethyl ketone (MEK). Films of the magnetic dispersion were prepared at temperatures of 40° C. to 60° C. It was found that the lower vapor pressure (higher boiling temperature) MBK and MEK solvents evaporated from the dispersion sufficiently slow so as to prevent the trioxane from crystallizing prior to sublimation thereby resulting in films of consistent quality.

TABLE 4

| COMPONENT | % VOLUME |
|---|---|
| $Fe_2O_3$ | 26.0 |
| Estane ® 5701 F-1 | 17.1 |
| Trioxane | 6.9 |
| Methyl Ethyl Ketone | 27.0 |
| Methyl Isobutyl Ketone | 22.9 |
| Boron Trifluoride Etherate | 0.1 |

The resulting films showed a percent gloss of 85 and a percent clear area of 100.

EXAMPLE V

Magnetic dispersions of 50% iron oxide based upon dry film thickness were formulated using 10.9% binder resin (VAGH UCAR ® vinyl chloride-vinyl acetate-vinyl alcohol resin, Union Carbide Corporation) and a solvent system of 13.3% trioxane and 66.6% MEK.

A solution of boron trifluoride etherate (as a polymerization initiator for trioxane) in MEK (20% by volume boron trifluoride etherate) was blended with the dispersion just prior to film formation so that the dispersion included initiator concentrations ranging between 0.5 to 1.5% by weight of the dispersion. The resulting films were allowed to cure. Thickness measurements were made of the uncured and cured films and are noted below in Table 5 in comparison to the theoritical film thickness for polymerized trioxane.

TABLE 5

| Example No. | Theoretical Thickness (mils) | Cured Thickness (mils) | Uncured Thickness (mils) |
|---|---|---|---|
| 1 | 1.5 | 1.5 | 4.5 |
| 2 | 1.1 | 1.2 | 3.6 |
| 3 | 1.0 | 1.0 | 3.0 |
| 4 | 1.1 | 1.1 | 2.2 |

Infrared spectroscopy was employed to detect the presence of poly(oxymethylene) in nonpigmented films (i.e., films containing no iron oxide particles). The infrared spectrum for films of this invention showed a characteristic trace indicating the presence of poly(oxymethylene), thereby confirming substantially complete polymerization of the trioxane in situ.

EXAMPLE VI

A dispersion was prepared using dioxolane, styrene, trioxane and iron oxide. The composition of the formulation is noted below in Table 6. The polymerization of these reactive monomers was initiated with a 50%/50% solution perchloric acid and boron trifluoride etherate. No volatile organic solvents, such as MEK, MBK, and the like were utilized in the formulation of this Example. The resultant magnetic coating possessed 85% gloss, and comparable magnetic properties as was indicated above in Table 4.

TABLE 6

| COMPONENT | % VOLUME |
|---|---|
| Trioxane | 30.0 |
| Dioxolane | 20.0 |
| Styrene | 9.2 |
| Iron Oxide | 50.0 |
| Perchloric Acid | 0.1 |
| Boron Trifluoride Etherate | 0.1 |

The above Examples demostrate that trioxane may be employed as a solvent (or cosolvent) for binder resin in the formulation of magnetic dispersions. And, the trioxane itself may be a reactive solvent in that a suitable polymerization initiator may be added to the dispersion so that the trioxane polymerizes in situ on the substrate (thereby obviating the need to allow sublimation of the trioxane). In either situation, the present invention provides for a significant reduction (or elimination) of potentially hazardous organic solvents typically employed in the production of conventional magnetic media.

Thus, while the invention has been described in connection with what is presently considered to be the most practical and preferred embodiment, it is to be understood that the invention is not to be limited to the disclosed embodiment, but on the contrary, is intended to cover various modifications and equivalent compositions included within the spirit and scope of the appended claims.

What is claimed is:

1. A method of forming magnetic recording medium comprising applying, onto a surface of a nonmagnetic substrate, a liquid dispersion comprised of a binder resin, a solvent for the binder resin, and a magnetic-recording effective amount of magnetic particles dispersed in the binder resin and solvent, and then curing the applied liquid dispersion so as to form a layer of the magnetic particles dispersed in a matrix of cured binder resin, and wherein the solvent for the binder includes trioxane.

2. A method as in claim 1, wherein the solvent includes at least one other organic solvent in addition to the trioxane.

3. A method as in claim 1 or 2, wherein the magnetic particles are present in an amount of at least about 50% by volume of dry thickness of the layer on the substrate.

4. A method as in claim 1 or 2 wherein the trioxane is present in an amount of not greater than about 50% by weight of the dispersion.

5. A method as in claim 1, further comprising adding to the liquid dispersion, an amount of a polymerization initiator effective to initiate polymerization of the trioxane in the liquid dispersion.

6. A method as in claim 5, further comprising the step of allowing the trioxane to polymerize in situ on the substrate.

7. A method of forming a magnetic recording medium, comprising the steps of:
(a) applying, onto a nonmagnetic substrate, a liquid film which consists essentially of a resinous binder, trioxane, a solvent for the binder and trioxane, and magnetic particles dispersed in the film in an amount effective to impart magnetic recording properties to the film; and then
(b) curing the binder to form a cured film layer on the substrate having the magnetic particles dispersed therein.

8. A method as in claim 7, further comprising the steps of heating the substrate to a temperature whereby substantially all of the trioxane and solvent are removed from the film.

9. A method as in claim 7, wherein step (a) includes incorporating a trioxane polymerization initiator into the liquid film in an amount sufficient to initiate polymerization of the trioxane.

10. A method as in claim 9, further comprising the step of allowing the trioxane to polymerize in situ on the substrate.

11. A method as in claim 10, wherein the initiator is selected from the group consisting of boron trifluoride etherate and Lewis acid initiator/catalyst systems.

12. A magnetic recording medium comprising a nonmagnetic substrate and a magnetic-recording effective amount of magnetic particles dispersed in a resin film matrix which includes poly(oxymethylene).

13. A magnetic recording medium as in claim 12, wherein the poly(oxymethylene) is a reaction product of trioxane polymerization.

14. An intermediate product useful to form a magnetic recording medium comprising a nonmagnetic substrate and a magnetic recording effective amount of magnetic particles dispersed in a resin film matrix which includes trioxane.

15. An intermediate product as in claim 14, wherein the resin matrix includes an effective amount of a polymerization initiator to initiate polymerization of the trioxane.

16. An intermediate product as in claim 14, wherein the film thickness is between about 1 to 6 mils.

17. An intermediate product as in claim 14, wherein the magnetic particles consist essentially of iron oxide particles.

18. An intermediate product as in claim 17, wherein the iron oxide particles are present in an amount of at least 50% by volume based on the dry thickness of the film.

19. An intermediate product as in claim 14, wherein said magnetic particles are acircular and are magnetically aligned.

20. A liquid dispersion capable of being applied as a film onto a surface of a substrate to form magnetic recording media, the liquid dispersion consisting essentially of a binder resin, a solvent for the binder resin, and a magnetic-recording effective amount of magnetic particles dispersed in the binder resin and solvent, and wherein said solvent includes trioxane.

21. A liquid dispersion as in claim 20, wherein the solvent is selected from the group of organic solvents which solubilize the trioxane and the binder.

22. A liquid dispersion as in claim 20, wherein the trioxane is present in an amount of up to at least about 50% by weight of the dispersion.

23. A liquid dispersion as in claim 20, further comprising an effective amount of a polymerization initiator to initiate polymerization of the trioxane.

24. A liquid dispersion as in claim 23, wherein the initiator is selected from the group consisting of Lewis acids.

25. A liquid dispersion as in claim 24, wherein the Lewis acid initiator is at least one selected from the group consisting of $BF_3$ and compounds which yield a $BF_3$ moiety.

26. A liquid dispersion as in claim 24 or 25, wherein the initiator is present in an amount of between about 0.5 to 1.5% by weight.

27. A liquid dispersion as in claim 24, wherein the initiator is borontrifluoride etherate.

28. A method of forming a magnetic recording medium comprising applying, onto a surface of a substrate, a film of the liquid dispersion of claim 20, and then curing the binder resin of the dispersion so as to from a layer of magnetic particles dispersed in the cured binder on the substrate surface.

29. A method as in claim 28, further comprising incorporating a polymerization initiator for the trioxane into the liquid dispersion, and then allowing the trioxane to polymerize in situ on the substrate surface.

30. A method as in claim 29, wherein the initiator is present between about 0.5 to about 1.5% by weight of the dispersion.

31. A method as in claim 29, further comprising the step of magnetically orienting the magnetic particles.

32. A method as in claim 31, further comprising calandering the cured layer on the nonmagnetic substrate.

* * * * *